Aug. 15, 1950     F. J. COZZOLI     2,518,870
VARIABLE DISPLACEMENT FILLING MACHINE
Filed Nov. 26, 1948     2 Sheets-Sheet 1
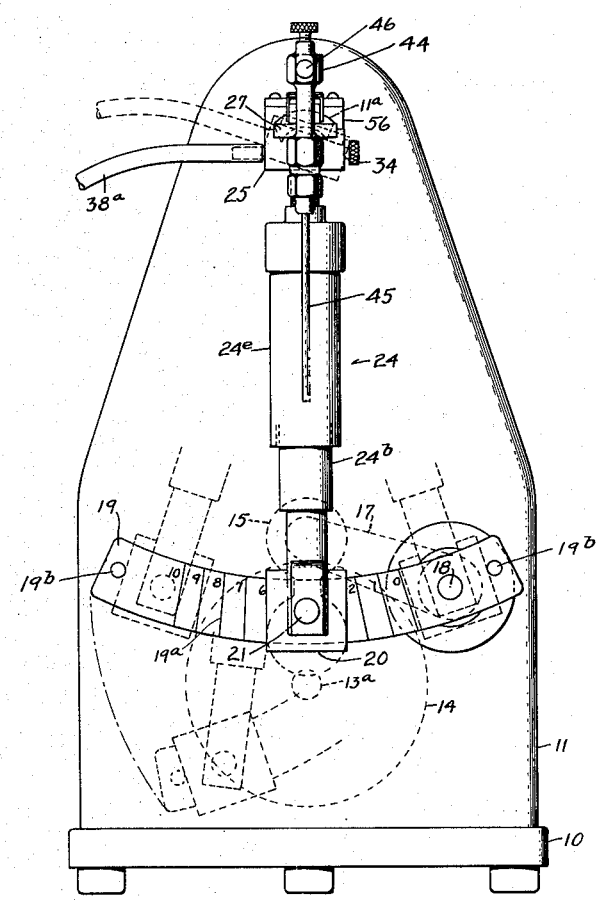
FIG.I.
INVENTOR.
BY Frank J. Cozzoli
Harold F. Scribner

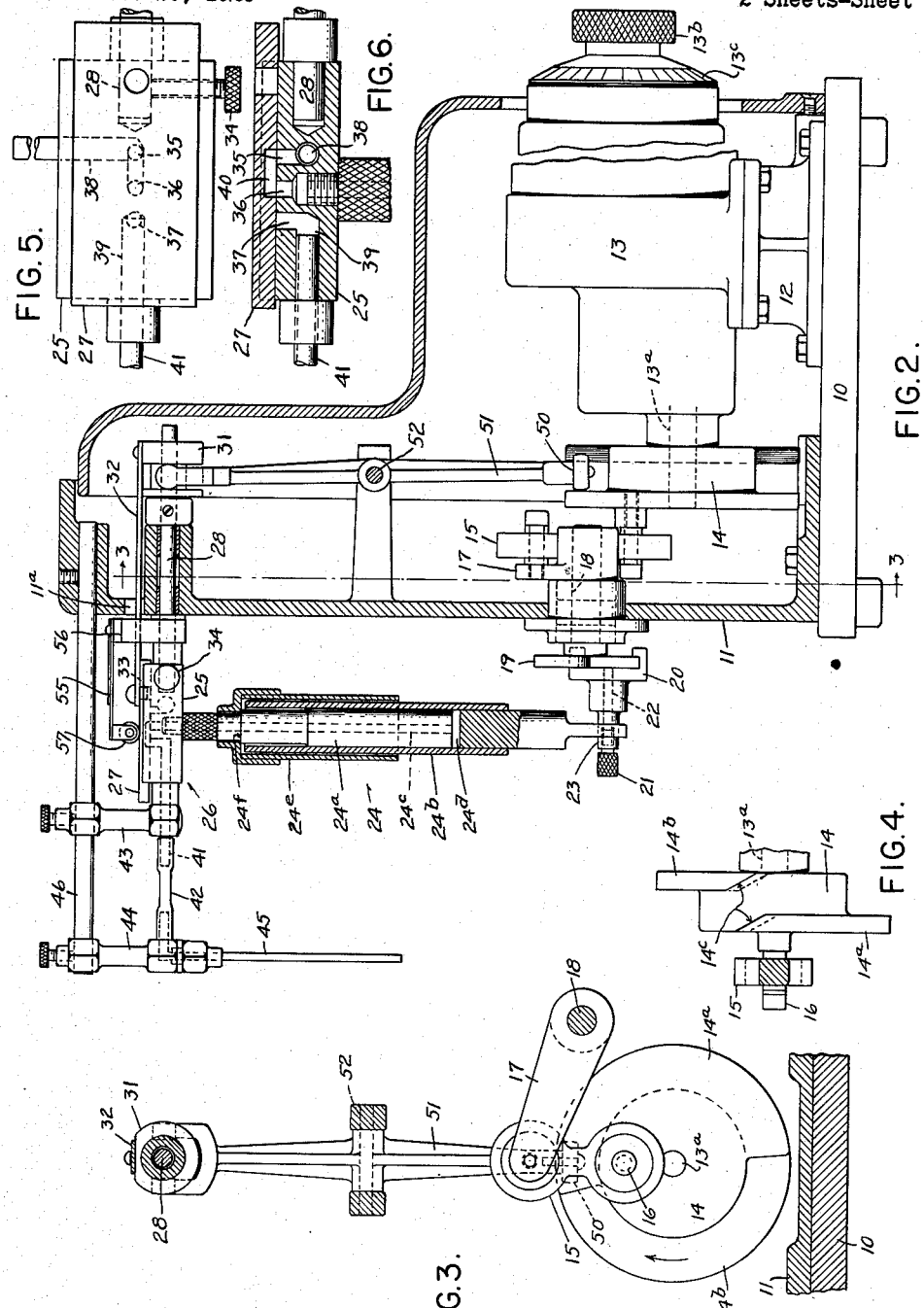

Patented Aug. 15, 1950

2,518,870

UNITED STATES PATENT OFFICE 2,518,870

VARIABLE DISPLACEMENT FILLING MACHINE

Frank J. Cozzoli, Plainfield, N. J.

Application November 26, 1948, Serial No. 62,121

19 Claims. (Cl. 226—108)

The present invention relates to liquid dispensing apparatus and is concerned more particularly with an improved machine for dispensing a measured quantity of a pharmaceutical preparation into a tube, vial or other desired container.

A primary aim of the invention is to obtain delivery of accurately measured quantity of a bulk liquid preparation into a vial, tube, ampul or like container in an expeditious manner and under substantially sterile conditions and to effect the filling of the containers in a way such that the inner walls of the throat of the container remains free of the preparation whereby to facilitate subsequent capping or sealing thereof.

A further aim of the invention is to effect the dispensing of a liquid preparation into a container in selectively variable quantities in accordance with the desired dosage required, and to effect the dispensing in a manner whereby substantially complete expulsion of the preparation from the measuring unit occurs in each complete cycle.

Still another aim of the invention is to effect the dispensing of measured quantities of a liquid preparation at rates of fills best suited to the nature of the preparation being processed, the quantity of preparation per fill, and to the speed and skill of the operator in handling the containers.

A further aim of the invention is to render available a variable speed, variable delivery dispensing machine adapted to dispense any of a wide range of pharmaceutical preparations and a machine that is sturdily constructed of relatively few parts, easy to clean, to operate, and to maintain.

The design and construction of a filling machine of the foregoing character involves many factors and the consideration of many problems not immediately apparent, chief among which is the need for extreme accuracy in quantity delivered; non-wetting of the throats of the containers; complete discharge of the medium from the measuring unit on each cycle; capacity for accurately measuring and dispensing fluid mediums of differing viscosities; capacity for varying the number of fills per hour depending upon the unit quantity to be delivered, viscosity of the medium, and dexterity of the operator; the need for maintaining, insofar as possible, sterile conditions in and about a machine designed to process pharmaceuticals; and the ability for easy and thorough sterilization of the parts contacted by the preparations before the processing operation is instituted.

In carrying forward the aims of the invention and to meet the needs above mentioned it is proposed to construct a dispenser embodying a variable stroke piston and cylinder type of measuring mechanism, preferably shielded against external contamination, and to connect the same directly to a two-way valve. The valve, in turn is connected to the supply source of medium and also to a delivery spout, hereinafter referred to as the filling needle.

In the embodiment disclosed, the two-way valve is preferably of the slide-valve type, the body of which is ported and provides connections for supply liquid, the measuring unit, and the delivery spout, and the relatively slidable member of the valve ported as alternately to connect the measuring unit with the supply and with the delivery spout. Preferably all of the mentioned parts are constructed for easy removal and of materials resistant to chemical reaction and capable of withstanding sterilization temperatures. The mechanisms for actuating the slide-valve and the measuring unit are preferably enclosed in a housing which is designed also as a support for the valve and measuring unit, both mounted externally thereof. The drive means includes a variable speed geared motor and a combined crank and slide-valve actuating cam so constructed and arranged that on the intake stroke of the measuring unit the valve is in one proper position of its shift and on delivery stroke of the unit the valve is in its other proper position of shift. These relative movements are, however, so coordinated and arranged that the intake stroke of the filling unit is caused, on the one hand, to start slightly ahead of the shifting of the valve from its delivery position whereby the last drop of dispensed fluid that tends to adhere to the filling needle is drawn within the needle and wetting of the throat or neck of the container on withdrawal of the needle is avoided, and on the other hand, the valve actuating mechanism is further arranged that the valve shifts from its intake position to its delivery position substantially coincidently with the start of the movement of the measuring unit on its fluid dispensing stroke so that there is no building up of pressure prior to delivery such as would cause excessive spurting of the liquid from the needle.

Complete delivery and complete expulsion of liquid from the measuring unit is attained in the instant embodiment by means of a power driven lever system, to one member of which an element of the measuring unit is adjustably secured. As the lever is oscillated, the elements of the measuring unit are reciprocated relatively, and fluid is caused to enter and leave the cylinder. The distance from the axis of oscillation of the lever that the measuring unit is attached determines the extent of piston or cylinder reciprocation and thereby the precise quantity delivered on each stroke. Ordinary crank and connecting rod arrangements of the past are unsuited for the present requirements firstly because variations in stroke are caused to occur at both ends of piston travel and secondly because of the continual entrainment of fluid occasioned by a change in piston position incident to the shifting of the crank pin of a connecting rod toward or away from center. The present invention proposes a structure wherein both of the aforementioned drawbacks are overcome. It is now proposed to pivotally support the measuring unit and to connect one element thereof to a curved oscillable lever, the curvature of the lever being concentric with the pivotal axis of the measuring unit when the unit is empty. It is further proposed to connect the curved lever to a second lever, which is actuated by a fixed throw crank and rod, in a manner such that the two levers are out of phase with each other by an amount equalling one-half the effective throw of the fixed crank. The members are so disposed in space that the curved lever is in the aforesaid concentric position when the crank is in one extreme position of throw, and in a position entirely to one side of that concentric position when the crank is in its other extreme position of throw. This conception of a lever system for actuating a piston and cylinder type of measuring unit insures not only that the entire variations in delivery are caused to occur wholly at one end of the piston (or cylinder) movement, but that full and complete discharge of the medium is occasioned in all positions of adjustment of the point of connection of the unit on the curved actuating arm.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which—

Figure 1 of the drawings is a front view of a filling machine embodying the principles of this invention and illustrating in full lines the compensating lever in one extreme position and its other extreme position in dotted lines.

Fig. 2 is a vertical sectional view, taken substantially on a medial plane of Fig. 1, showing the interior structure of the housing and portions of the measuring unit.

Fig. 3 is a sectional view of portions of the combination crank and valve-actuating cam.

Fig. 4 is a plan view of the valve actuating cam.

Fig. 5 is a plan view of a preferred form of valve.

Fig. 6 is a vertical sectional view on a medial plane longitudinally of the valve.

Referring more particularly to Figure 2 of the drawings, the embodiment of the invention illustrated comprises a base member 10, from which rises a front panel member 11, and a motor base 12 that supports a drive motor 13. The drive motor illustrated is a standard commercial item known as a variable speed geared motor in which the R. P. M. of the output shaft 13a has a speed range of 8 R. P. M. to 53 R. P. M. The motor is furnished with a control knob 13b and a graduated dial 13c by means of which the speed of the output shaft 13a may be regulated. The motor also is furnished with a resistor and a built-in speed governor (not shown).

The output shaft 13a has mounted thereon a disc like crank member 14 to which a ball bearing mounted connecting rod 15 is pivoted as at 16. The other end of the connecting rod is pivoted to the free end of a lever 17, which in turn is mounted to a shaft 18 that extends through the front panel 11, and terminates in an arc shaped compensating lever 19. As illustrated in Fig. 1, the levers 17 and 19 are fixedly positioned out of phase with each other by an amount equalling one-half the effective throw of the crank 14—16 so that while the connecting rod lever 17 may be oscillated above and below a medial plane through the axis of the shaft 18, the compensating lever 19 is oscillated wholly to one side of the said medial plane. This improved construction provides for returning of the piston relative to the cylinder always to the same position at the end of the delivery stroke. Complete expulsion of the medium takes place on each cycle and a minimum quantity remains in the cylinder.

The face of the compensating lever 19 is adapted to be traversed by a T-slot yoke member 20 which may be clamped thereto in any radially disposed position by means of a clamp screw 21 and clamp pin 22. The yoke 20 is formed with a projection 23 which is adapted to fit an eye of one element of a measuring unit indicated generally at 24.

The opposite end of the measuring unit is detachably coupled to the body part 25 of a slide valve 26. The structure of the valve is illustrated more clearly in Figs. 5 and 6 and the entire assembly is mounted upon a shaft 28 that in turn is pivotally supported in bearings provided in the panel 11. The shaft 28 extends rearwardly from its bearings and slidably mounts a shifter spool 31. The spool 31 is connected with a valve slide plate 27 by means of a strip-like member 32 that passes through an opening 11a in the front panel. The connection with the valve plate is in the form of a button and recess 33 and the valve body 25 is clamped to the shaft 28 by means of a knurled clamp screw 34 whereby easy detachability is afforded.

The body of the valve is drilled transversely to provide three vertical ports 35, 36, and 37, and horizontally to provide an intake port 38 and a delivery port 39. Normally the ports 35, 36, and 37 are out of communication with each other, but communication alternately between ports 35 and 36, and 36 and 37, is established by means of a bridging port 40 formed in the valve slide plate 27. When the plate is in its rear position (Fig. 6) ports 38, 35, 40, and 36 communicate and flow to the cylinder of the measuring unit is established. When the valve plate is forward (Fig 2) ports 36, 40, 37, 39 communicate and flow from the measuring cylinder to the filling needle is established. A hose nipple 41 is pressed into the port 39 and extends forward through a bearing provided by a support 43 and terminates in a flexible connecting tube (such as pure rubber) 42. The other end of the tube is fitted to a ported needle adapter 44 which mounts a tubular filling needle 45. The supporting members 43 and 44 are detachably secured to an overarm 46 that projects from the panel 11.

In the embodiment illustrated in Figs. 2 and 3, the measuring unit 24 comprises a piston member 24a that is removably connected to the valve body 25, and a cylinder member 24b that is connected with the stem 23 of the actuating yoke 20. In this arrangement of elements the piston is stationary and the cylinder reciprocates, and both oscillate, pendulum fashion, about the axis of the shaft 28 as an incident to the arcuate movement of the yoke member 20 about its pivotal axis 18. Inasmuch as the piston is screw threaded into the valve assembly 26, the valve also oscillates, and this oscillatory movement is absorbed by the flexible connection 42, so that the filling needle 45 remains stationary.

As indicated in Fig. 2, the piston 24a is provided with a central conduit 24c that extends from the head end into the valve and communicates at all times with the interior of the cylinder and with the port 36. The space 24d between the head of the piston and the end wall of the cylinder forms an expansible measuring chamber for receiving the liquid to be packaged. If the point of connection of the cylinder with the arm 19 is made coincident with the pivotal axis 18, there is no relative reciprocation between the piston and cylinder and no intake or discharge therefrom. As the yoke 20 is moved radially outward on the curved arm 19, and clamped, relative reciprocation between piston and cylinder occurs and of a magnitude determined by the length of the arc of swing at the point of connection of the cylinder with the arm 19. By virtue of the curvature given to the arm 19 which is concentric with the pivotal axis of the valve when the cylinder is at the end of its discharge stroke, the movement of the point of connection of the cylinder with the arm has no effect per se upon the relative positions of the piston and cylinder. Hence there is a complete discharge from the cylinder in all positions of stroke adjustment. Volumetric displacement is, in this embodiment, determined alone by the length of stroke imparted to the cylinder which, in turn, is determined by the radial location of the pivotal point of connection of the cylinder with the curved arm 19 in relation to the pivotal axis 18.

In the preferred embodiment of this invention, the cylinder is the lower member of the measuring unit, and the piston the upper member. In consequence slippage of fluid past the piston is effectively eliminated firstly because it must "climb" the cylinder wall on the pressure stroke and secondly, any film of liquid that tends to climb the wall is drawn back into the cylinder on the following suction stroke. With this arrangement the force of gravity acts to discourage climbing and to encourage return of escaping fluid. Were the piston and cylinder members to be reversed, any piston slippage that runs down the piston is subtractive on the quantity delivered through the needle and is lost. Moreover, the fluid that runs down the piston to the exterior tends to oxidize and become gummy with deleterious effect upon the operation of mechanisms.

To guard against undue exposure and the possibility of contamination, the upper end of the cylinder in the present embodiment is continually covered by a sleeve 24e that is supported upon a shoulder 24f. The sleeve is readily removed by slipping it over the threaded end of the piston after the latter is unscrewed from the valve.

As hereinbefore mentioned the movement of the slide valve is synchronized with the strokes of the filling unit. This is effected by means of a cam track formed upon the crank disc 14. Figs. 2, 3, and 4 illustrate the structure most clearly. The disc 14 is formed with two half flanges 14a and 14b, oppositely extending and located at opposite sides of the disc. The radially disposed leading and trailing ends of each flange are inwardly beveled as at 14c, and the distance between the faces of each pair of bevels is made to accommodate a follower roller 50. The roller is pivoted to the lower end of a lever 51 which in turn is pivotally supported as at 52 to arms extending from the panel 11. The upper end of the lever 51 forks the previously described spool 31. As the crank disc 14 revolves the roller 50 is caused to be shifted laterally first one way by one flange bevel and then the other way by the opposite flange bevel approximately 180 degrees away. One pair of bevels 14c are disposed substantially on a line radial of the center of the disc which line intersects the axis of the crank pin 16. This pair of bevels is disposed so as to shift the roller 50 and hence the valve, substantially coincidently with the change in direction of pump stroke at the end of the intake movement. The other pair of bevels is disposed slightly offset from the aforesaid radial line so that the piston reaches the end of the discharge stroke and starts on the intake stroke slightly before the valve is actuated to its intake position. This delaying of valve actuation at the end of the delivery stroke and at the start of the intake stroke leaves the delivery channels of the valve in communication with the piston cylinder and on the initial portion of the intake stroke, fluid is drawn back through the needle a short distance. Any droplet that adheres to the needle is thereby drawn inside the needle and the possibility of wetting the vial throat on withdrawal of the needle is eliminated. Almost immediately however, the valve is shifted and communication is established with the supply line 38. Fig. 4 illustrates in full lines the delaying position of the cam faces 14c and in dotted lines the position of the opposite cam faces with relation to a plane that contains the axis of the crank pin 16 and the axis 13a of the disc 14.

The valve plate 27 has its under surface lapped and carefully fitted to the upper surface of the body 25 and is normally spring pressed in engagement therewith. A leaf spring 55 is provided to maintain the valve plate seated. The spring 55 is secured at one end to a collar 56 and carries a roller 57 at its free end that is tensioned against the plate 27. This construction assures substantially frictionless valves seating, provides for easy removability of the valve upon unclamping the screw 34 and the lifting of the button 23 from its recess, and the withdrawing of the assembly from the end of the shaft 28. Prior to removing the valve, supports 43 and 44 are released and the entire system including the measuring unit 24, may then be taken off as a unit. In removing or replacing the assembly, the eye of the piston cylinder is moved axially of the actuating yoke 23 and is so made as to pass freely over the yoke clamp screw 21. Stroke adjustment once determined, is not disturbed when the parts are disassembled, as for cleaning and sterilization.

The operation of the mechanism is extremely simple and requires merely the insertion of the supply tube 38a into a bulk supply of the medium to be packaged, and a supply of vials, tubes or the like, handily positioned. The quantity to be delivered into the containers is determined by the position the actuating yoke 23 occupies on the compensating arm 19. The more remote from the axis of oscillation 18 the yoke is clamped, the greater will be the stroke imparted to the cylinder of the measuring unit. For convenience the compensating arm may be calibrated, as indicated at 19a, to indicate selected settings in whole or fractional units. Stop pins 19b may also be provided to guard against an inadvertent attempt to obtain an over adjustment. When the desired stroke and delivery adjustment has been made, the motor is started and adjusted to the desired speed. Thereafter the operator merely places an unfilled container in filling relation with the needle 45 to receive its charge of the preparation. As the measuring unit is moving on its intake stroke the operator removes the filled container and positions an empty container in readiness for the next change.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A liquid dispenser of the character described combining piston and cylinder elements cooperatively related, selector valve means connected directly with one of said elements, said valve means being provided with an inlet port and a discharge port and said valve means being operable to connect the interior of the cylinder with said inlet port and with said discharge port in alternation; means connected with one of said elements for effecting relative reciprocation therebetween, and means including an asymmetrical cam operatively associated with said valve to actuate said valve in synchronism with the reciprocations imparted to said one element whereby to effect valve actuation first coincidently with a change of direction of said relative reciprocation and then subsequently to a change of direction of said relative reciprocation.

2. A dispenser as set forth in claim 1 in which the valve and the piston and cylinder elements are mounted for oscillatory movement, a normally stationary filling needle connected to the discharge port of the valve, and connecting means between the valve and the filling needle for absorbing the oscillatory motion of the valve.

3. A variable delivery liquid dispenser of the character described combining a pump embodying relatively movable piston and cylinder elements cooperatively related, valve means connected with one of said elements, said valve means being provided with an inlet port and a discharge port and including a member operable to connect the interior of the cylinder alternately with said inlet port and with said discharge port, crank means operatively connected with one of said elements for effecting relative reciprocation therebetween, and cam means operative in fixed phase relation with said crank means to actuate said valve coincidently with relation to the start of the discharge cycle of said pump and lately with relation to the start of the intake cycle of said pump.

4. A dispenser as set forth in claim 3 in which the crank means includes a connecting rod and a two-armed pivoted lever one of the said arms being curved, means connecting said connecting rod to one arm of said lever, means pivotally connecting one of the elements of said pump to the curved arm of said lever, and means operable to adjust one of the said connections electively toward or away from the pivotal axis of said lever whereby to effect a variation in pump displacement and so that the total variation in displacement occurs at one end of the stroke imparted to the said movable element.

5. A variable delivery liquid dispenser of the character described combining a piston member and a relatively movable cylinder member cooperatively related, valve means operatively connected with one of said members, said valve means including a movable member having two effective positions and operable alternately to connect the interior of the cylinder with a source of supply and with a delivery conduit, means connected with said cylinder member for reciprocating the cylinder relative to the piston, means including an asymmetrical cam for actuating said valve to one of its effective positions coincidently with a reversal in direction of movement of said cylinder and to its other effective position subsequently to a reversal in the direction of movement of said cylinder member.

6. A dispenser as set forth in claim 5 in which said actuations of the valve connects the interior of the cylinder with the delivery port at the end of the liquid intake cycle of movement of the cylinder and with the intake port subsequent to the start of intake movement of the cylinder.

7. A filling machine for delivering measured quantity of a preparation combining a measuring pump comprising relatively movable piston and cylinder elements, valve means for the pump, means connected to actuate one of said pump elements relative to the other whereby to effect pumping action comprising a crank member, a curved lever mounted and arranged to be oscillated from said crank member, means operatively connecting one of the elements of said pump to said lever at a point electively coincident with or radially remote from the axis of oscillation of the lever, the radius of curvature of said lever being such as automatically to maintain constant one extreme position of stroke of the movable element of said pump in any position of adjustment of the point of connection of the said last named means to said curved lever.

8. A filling machine for delivering a measured quantity of liquid medium into a container comprising a pump mechanism, valve means connected with the pump mechanism operative when actuated to connect the pump alternately with a source of supply and with a filling spout, power means to actuate said pump and said valve means to effect pumping action whereby to cause liquid medium from the source of supply to enter the pump on a suction stroke and to be discharged therefrom through the filling spout on a pressure stroke, adjustable means for varying pump displacement, said power means including an asymmetrical cam operative to effect valve actuation substantially coincident with the start of the discharge cycle of the pump and appreciably later than the start of the intake cycle of the pump so that part of the liquid in the filling spout is returned to the pump prior to the connecting thereof with said supply.

9. A filling machine combining a pivotally supported piston element, a cooperatively related cylinder member associated therewith, means to reciprocate said cylinder from a fixed zero displacement position to an electively variable maximum displacement position, valve means operative to connect the interior of said cylinder alternately with a source of supply and with a delivery conduit, and actuating means for the said valve including a cam having a portion effective through an initial portion of the intake cycle of movement of said cylinder to delay valve actuation whereby to cause a reversal in the flow of liquid in the delivery conduit at the end of a normal discharge therethrough.

10. The filling machine of claim 9 in which the axes of piston and cylinder elements are arranged substantially vertically and in which said cylinder is open at one end and is disposed with the open end upward.

11. The combination of claim 9 in which the cylinder member is open at one end, and sleeve means carried by the piston member in telescoping relation with the cylinder for shielding the open end thereof against ingress of foreign matter.

12. A filling machine combining a measuring unit of the expansible chamber type, valve means therefore operative to connect the expansible chamber of the measuring unit alternately with a source of supply and with a delivery conduit, means for actuating said measuring unit, means for actuating said valve in substantial coincidence with reversals in the intake and discharge cycles of actuation of said measuring unit, said last named means being constructed and arranged to connect the expansible chamber of the measuring unit with the delivery conduit at the start of the discharge cycle and to continue the said connection effective until after the intake cycle starts, and means for varying the displacement capacity of the measuring unit.

13. In a filling machine having a frame, a shaft rotatably mounted in the frame, means to oscillate said shaft, a second shaft rotatably mounted in the frame above and laterally offset from said first named shaft, valve means having an inlet port and a discharge port detachably mounted to said second shaft, a curved lever mounted to said first shaft, said lever having a radius of curvature corresponding to the linear distance between the said two shafts, a pump piston carried by said valve means, a pump cylinder pivotally carried by said curved lever in cooperative relation with said piston, means to oscillate said lever thereby to effect reciprocation of said cylinder relative to the piston, and means for adjusting the point of pivotal connection of the cylinder along the said curved lever whereby to vary pump displacement with the total variation in displacement occurring wholly at one end of cylinder stroke.

14. In the filling machine of claim 13 means automatically operative at the end of a normal pump discharge cycle to retract a portion of the liquid in the discharge port.

15. In a filling machine having a frame, a shaft rotatably mounted in the frame, means to oscillate said shaft including a first lever, a second shaft rotatably mounted in the frame above and laterally offset from said first named shaft, pump means detachably mounted to said second shaft, a second lever mounted to said first shaft, means detachably connecting said pump means to said second lever in out-of-phase relation with said first lever whereby to effect pump actuation, and means for adjusting the point of connection of the pump means radially of said second lever whereby to vary pump displacement with the total variation in pump displacement occurring wholly at the end of the pump intake cycle.

16. A filling machine combining a piston and cylinder pump mechanism, valve means for the pump operative alternately to connect the pump with a source of supply liquid on a pump intake cycle and with a delivery spout on a pump discharge cycle, means for actuating said pump whereby to effect pumping action comprising an oscillatable lever, means to oscillate said lever through a fixed arc in which one limit of movement corresponds at all times to the position of the piston relative to the cylinder of said pump mechanism when the parts are in their fully discharge position, means for operatively connecting said pump to said lever in a preselected position radially away from the axis of oscillation of said lever whereby to effect a predetermined pump displacement with the total of the change in displacement effected between any two adjustments occurring at the end of the pump intake cycle only, and means to actuate said valve in substantial coincidence with reversals in the cycles of pump operation.

17. In a filling machine embodying a variable displacement pump, means to actuate the pump comprising a rotatable crank member, a first lever operatively connected therewith for oscillation thereby, a supporting shaft for said lever, a second lever mounted to said shaft in out-of-phase relation to said first lever, and a normally fixed but adjustable connection between said second lever and the pump whereby to actuate the pump in response to the oscillatory movement imparted to said lever.

18. The filling machine combination of claim 17 in which the pump is supported for unitary pivotal movement and said second lever is provided with an arcuate pump connecting track portion concentric with the axis of movement of the pump about its pivot when the pump is in its fully discharged position.

19. In a filling machine embodying a variable displacement pump, valve means operatively associated with the pump, means mounting the pump and valve means for unitary movement about a fixed pivot, means to actuate the pump comprising a rotatable crank member, a first lever operatively connected therewith for oscillation thereby, a supporting shaft for said lever, a second lever mounted to said shaft in out-of-phase relation with said first lever, means including a normally fixed but adjustable member for operatively connecting said pump to said second lever whereby to effect actuation of the pump in response to the oscillatory movement imparted to said first lever.

FRANK J. COZZOLI.

REFERENCES CITED

The following references are of record in the file of this patent:

UNITED STATES PATENTS

| Number | Name | Date |
| --- | --- | --- |
| 437,162 | Miller | Sept. 23, 1890 |
| 535,293 | Leitch | Mar. 5, 1895 |
| 1,164,831 | McDermott | Dec. 21, 1915 |
| 1,191,453 | Myers | July 18, 1916 |
| 1,781,416 | Sundstrand | Nov. 11, 1930 |
| 2,148,899 | Carski et al. | Feb. 28, 1939 |
| 2,348,958 | Celio | May 16, 1944 |